United States Patent
Chi et al.

(10) Patent No.: US 12,338,373 B2
(45) Date of Patent: Jun. 24, 2025

(54) PRESSURE-SENSITIVE ADHESIVE COMPOSITION

(71) Applicant: LG Chem, Ltd., Seoul (KR)

(72) Inventors: Han Na Chi, Daejeon (KR); Su Jeong Kim, Daejeon (KR); Sang Ha Son, Daejeon (KR); Chang Hwan Ju, Daejeon (KR); Geun Ho Park, Daejeon (KR); Seong In Jo, Daejeon (KR); Sung Soo Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 911 days.

(21) Appl. No.: 17/258,976

(22) PCT Filed: Jul. 25, 2019

(86) PCT No.: PCT/KR2019/009239
§ 371 (c)(1),
(2) Date: Jan. 8, 2021

(87) PCT Pub. No.: WO2020/022804
PCT Pub. Date: Jan. 30, 2020

(65) Prior Publication Data
US 2021/0163800 A1 Jun. 3, 2021

(30) Foreign Application Priority Data
Jul. 25, 2018 (KR) ......................... 10-2018-0086332

(51) Int. Cl.
*C09J 153/00* (2006.01)
*C09J 7/20* (2018.01)
*G02B 5/30* (2006.01)

(52) U.S. Cl.
CPC ............... *C09J 153/00* (2013.01); *C09J 7/20* (2018.01); *G02B 5/305* (2013.01); *C09J 2301/312* (2020.08)

(58) Field of Classification Search
CPC ... C09J 153/00; C09J 7/20; C09J 7/387; C09J 2301/312; C09J 2203/318; C09J 2301/408; C08K 5/5435; G02B 5/305; G02B 5/3025
See application file for complete search history.

(56) References Cited

U.S. PATENT DOCUMENTS

| 7,825,189 B2 | 11/2010 | Tomita et al. |
| 2014/0099495 A1 | 4/2014 | Kim et al. |

(Continued)

FOREIGN PATENT DOCUMENTS

| CN | 107254269 A | 10/2017 |
| EP | 3489320 A1 | 5/2019 |

(Continued)

OTHER PUBLICATIONS

Search Report for Chinese Application No. 201980046564.X dated Nov. 23, 2021. 3 pgs.

(Continued)

*Primary Examiner* — Scott R. Walshon
(74) *Attorney, Agent, or Firm* — Lerner David LLP

(57) ABSTRACT

A pressure-sensitive adhesive composition, an optical laminate, a polarizing plate and a display device are provided. The pressure-sensitive adhesive composition includes a block copolymer containing a first block having a glass transition temperature of 50° C. or more and having a cross-linkable functional group, a second block having a glass transition temperature of −10° C. or less, and an epoxysilane compound. The pressure-sensitive adhesive composition according to the present application can provide excellent durability and excellent optical characteristics with respect to the pressure-sensitive adhesive polarizing plate.

16 Claims, 1 Drawing Sheet

Liquid crystal direction: direction away from side tab, top and bottom cross

(56) References Cited

U.S. PATENT DOCUMENTS

| | | | |
|---|---|---|---|
| 2015/0125632 | A1 | 5/2015 | Lee et al. |
| 2017/0003426 | A1* | 1/2017 | Kunai ................. G02B 5/3033 |
| 2017/0022396 | A1 | 1/2017 | Kimura et al. |
| 2017/0355889 | A1 | 12/2017 | Kim et al. |
| 2019/0264077 | A1 | 8/2019 | Park et al. |

FOREIGN PATENT DOCUMENTS

| | | | |
|---|---|---|---|
| JP | 2007138057 A | 6/2007 |
| JP | 3997271 B2 | 10/2007 |
| JP | 2015199942 A | 11/2015 |
| JP | 2016522854 A | 8/2016 |
| JP | 2017171833 A | 9/2017 |
| JP | 2018506605 A | 3/2018 |
| KR | 20130087961 A | 8/2013 |
| KR | 101382577 B1 | 4/2014 |
| KR | 20140046366 A | 4/2014 |
| KR | 20140147728 A | 12/2014 |
| KR | 20160074425 A | 6/2016 |
| KR | 20180033092 A | 4/2018 |
| TW | 201420715 A | 6/2014 |

OTHER PUBLICATIONS

Extended European Search Report including Written Opinion for Application No. 19840738.9 , dated Jun. 28, 2021, 9 pages.
International Search Report for PCT/KR2019/009239 mailed Oct. 25, 2019; 3 pages.

* cited by examiner

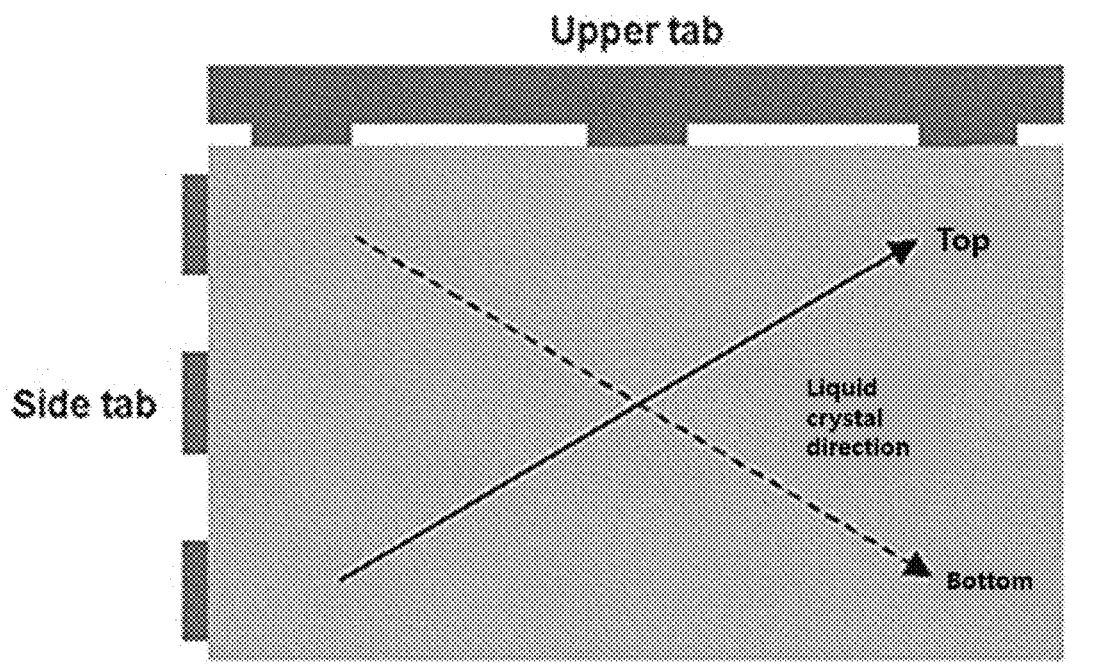
Liquid crystal direction: direction away from side tab, top and bottom cross

PRESSURE-SENSITIVE ADHESIVE COMPOSITION

CROSS-REFERENCE TO RELATED APPLICATIONS

The present application is a national stage entry under 35 U.S.C. § 371 of International Application No. PCT/KR2019/009239 filed on Jul. 25, 2019, which claims priority to Korean Patent Application No. 10-2018-0086332 filed on Jul. 25, 2018, the disclosures of which are incorporated herein by reference in their entirety.

TECHNICAL FIELD

The present application relates to a pressure-sensitive adhesive composition. More specifically, the present application relates to a pressure-sensitive adhesive composition and an optical laminate including the same.

BACKGROUND ART

A liquid crystal display device (hereinafter, "LCD device") has a predetermined lamination configuration. For example, it comprises a liquid crystal panel, which contains a liquid crystal component injected between two transparent substrates, and an optical film. The optical film may include a polarizing film, a retardation film, a luminance enhancement film, and the like, and a pressure-sensitive adhesive for optical films can be used for lamination between these optical films or attachment of the optical film to an adherend such as a liquid crystal panel. The device of the above configuration is required to have not only excellent high-temperature/high-humidity durability, but also a characteristic in which the unique functions exhibited by the optical film are not limited by other adjacent configurations.

DISCLOSURE

Technical Problem

It is one object of the present application to provide a pressure-sensitive adhesive composition and a pressure-sensitive adhesive optical laminate comprising the same.

It is another object of the present application to provide a pressure-sensitive adhesive composition that can provide excellent durability even at a high temperature of 100° C. or more and/or a high humidity condition of 65° C. and 95%.

It is another object of the present application to provide a pressure-sensitive adhesive composition that can improve light characteristics of an optical laminate.

The above objects and other objects of the present application can all be solved by the present application described in detail below.

Technical Solution

In one example of the present application, the present application relates to a pressure-sensitive adhesive composition. The pressure-sensitive adhesive composition may comprise a block copolymer. In the present application, the term "block copolymer" may refer to a copolymer including blocks of different polymerized monomers from each other.

In one embodiment of the present application, the pressure-sensitive adhesive composition may include a block copolymer, where the block copolymer may include a first block having a glass transition temperature of 50° C. or more and having a cross-linkable functional group; a second block having a glass transition temperature of −10° C. or less; and an epoxysilane compound, and wherein the refractive index ($R.I._1$) of the first block and the refractive index ($R.I._2$) of the second block are calculated through the following equation and satisfy the following relational expression:

$$R.I.=\{Rn \times (Wn/100)\} \qquad \text{[Equation]}$$

wherein, R.I. is the refractive index of the first block or the second block, $Wn/100$ is the weight fraction of the monomer component used to form the first block or the second block, and Rn is the refractive index of the homopolymer of each monomer;

$$|\Delta R.I.|=|R.I._1-R.I._2|<0.011 \qquad \text{[Relational Expression]}$$

wherein, $\Delta R.I.$ is the absolute value of the difference between the refractive index ($R.I._1$) of the first block and the refractive index ($R.I._2$) of the second block.

The block copolymer may comprise a first block having a glass transition temperature of 50° C. or more and having a cross-linkable functional group; and a second block having a glass transition temperature of −10° C. or less. In the present application, the "glass transition temperature of the block" constituting the block copolymer may mean a glass transition temperature calculated according to the method described in the following examples.

In one example, the glass transition temperature of the first block may be 50° C. or more, 60° C. or more, 70° C. or more, 75° C. or more, or 80° C. or more. The upper limit of the first block glass transition temperature is not particularly limited, but may be, for example, 150° C. or less, 140° C. or less, 130° C. or less, 120° C. or less, or 110° C. or less or so.

In one example, the glass transition temperature of the second block may be −10° C. or less, −20° C. or less, −30° C. or less, or −35° C. or less. The lower limit of the second block glass transition temperature is not particularly limited, but may be, for example, −80° C. or more, −70° C. or more, or −60° C. or more.

The copolymer containing both blocks satisfying the above glass transition temperature range can form a fine phase separation structure in the pressure-sensitive adhesive. Since the block copolymer exhibits appropriate cohesive force and stress relaxation property depending on the temperature change, a pressure-sensitive adhesive that physical properties required in an optical film, such as interface adherence, high-temperature endurance reliability, light leakage prevention property and re-workability, are kept excellent can be formed.

In one example, the block copolymer of the present application comprising the two blocks may be a diblock copolymer or triblock copolymer. The diblock copolymer may be advantageous in consideration of the interface adherence, high-temperature endurance reliability, stress relaxation property and re-workability of the pressure-sensitive adhesive.

In general, in the case of a pressure-sensitive adhesive optical laminate that is driven under heat conditions such as high temperature or high temperature/high humidity, it is preferable to be configured to have durability even under such conditions. In this regard, a method of increasing the content of the first block having a glass transition temperature of 50° C. or more or increasing the glass transition temperature of the first block may be considered in order to secure high-temperature durability for the optical laminate. In addition, a method of securing high-temperature durability by including the cross-linkable functional group of the first block may be considered. However, the inventors of the present application have confirmed that such a configuration can also increase durability of a pressure-sensitive adhesive polarizing plate, but can consequently inhibit the optical characteristics of the pressure-sensitive adhesive polarizing plate while increasing the difference in refractive index between the first block and the second block. Specifically, the inventors of the present application have confirmed that the larger the refractive index difference between two adjacent blocks in the block copolymer, a pressure-sensitive adhesive layer formed from the composition comprising the relevant block copolymer reduces the optical characteristics of the pressure-sensitive adhesive optical laminate, for example, in particular, a polarization degree (P.E.) and crossed nicol transmittance. According to the present application, as the refractive index (R.I.) of each block constituting the block copolymer satisfies a predetermined relationship, a pressure-sensitive adhesive having excellent durability can be provided, without lowering light characteristics of an optical element.

In the present application, the block copolymer has the refractive index $(R.I._1)$ of the first block and the refractive index $(R.I._2)$ of the second block, which are calculated through the following equation, satisfying the following relational expression.

$$R.I.=\Sigma\{Rn \times (Wn/100)\} \quad \text{[Equation]}$$

In Equation above, R.I. is the refractive index of the first block or the second block, Wn/100 is the weight fraction of the monomer component used to form the first block or the second block, and Rn is the refractive index of the homopolymer of each monomer. That is, the right side in Equation above is the result of multiplying the weight fraction of the used monomer by the refractive index indicated when the monomer has formed the homopolymer.

$$|\Delta R.I.|=|R.I._1-R.I._2|<0.011$$

In Relational Expression above, $\Delta R.I.$ is the absolute value of the difference between the refractive index $(R.I._1)$ of the first block and the refractive index $(R.I._2)$ of the second block.

In Relational Expression above, the absolute value lower limit of $\Delta R.I.$ is not particularly limited, but may be 0 or more. For example, it may be more than 0, specifically 0.00001 or more.

A polarizing plate to which a pressure-sensitive adhesive is not attached has crossed nicol transmittance (Tc) of less than 0.002% and a polarization degree (P.E) of 99.996 to 99.998%. Since the pressure-sensitive adhesive should not interfere with the optical characteristics of such a polarizing plate, it is preferable that even if the pressure-sensitive adhesive is attached, the pressure-sensitive adhesive polarizing plate keeps the crossed nicol transmittance (Tc) and the polarization degree (P.E.) at the above level. That is, even when the error upon the measurement is taken into consideration, it is preferable that the crossed nicol transmittance (Tc) and the polarization degree (P.E.) of the pressure-sensitive adhesive polarizing plate in the state where the pressure-sensitive adhesive is attached satisfy the above level. As confirmed in the following experimental examples, in the case of $|\Delta R.I.|>0.011$, as the crossed nicol transmittance (Tc) is 0.002% or more or the polarization degree (P.E.) is 99.993% or less upon measuring light characteristics of the pressure-sensitive adhesive polarizing plate, the optical characteristics of the pressure-sensitive adhesive polarizing plate are lowered. That is, the pressure-sensitive adhesive comprising the block copolymer that does not satisfy the above relational expression is not suitable as a pressure-sensitive adhesive for polarizing plates.

When the relational expression is satisfied, it is possible to prevent deterioration of optical characteristics of the pressure-sensitive adhesive optical laminate while ensuring sufficient high-temperature durability. Such a refractive index can be secured by adjusting the type of the monomer forming each block, the type of the functional group included in the monomer, the content of the monomer, the glass transition temperature of each block, the content ratio between blocks, and the like.

In one example, the block copolymer may be a cross-linkable copolymer having a cross-linkable functional group. More specifically, the block copolymer may comprise a polymerized unit derived from a compound capable of providing a cross-linkable functional group in the first block and/or the second block.

The kind of the cross-linkable functional group is not particularly limited. For example, a hydroxyl group, a carboxyl group, an epoxy group, an isocyanate group or a nitrogen-containing functional group can be used. As long as such a cross-linkable functional group can be provided in the first block and/or the second block, the kind of the specific compound is not particularly limited either. For example, a hydroxy group-containing monomer such as hydroxyalkyl (meth)acrylate or hydroxyalkylene glycol (meth)acrylate; a carboxyl group-containing monomer such as (meth)acrylic acid, 2-(meth)acryloyloxy acetic acid, 3-(meth)acryloyloxy propionic acid, 4-(meth)acryloyloxy butyric acid, acrylic acid dimer, itaconic acid, maleic acid and maleic anhydride or a nitrogen-containing monomer such as (meth)acrylamide, N-vinylpyrrolidone or N-vinylcaprolactam, etc. may be used alone or in combination of two or more.

In one example, the first block or the second block may contain an aromatic group. The kind of specific aromatic groups is described below.

In another example, when the second block contains an aromatic group, the second block may simultaneously contain a cross-linkable functional group and an aromatic group.

In the present application, the first block having a relatively high glass transition temperature can form a hard segment having a relatively rigid physical property in the block copolymer. The first block may be present in a glass phase at room temperature and may serve to impart cohesive force to the pressure-sensitive adhesive comprising the block copolymer.

If the block having a glass transition temperature in the above range can be formed and the relational expression for the refractive index can be satisfied, the kind or content of the monomer for forming the first block is not particularly limited.

In one example, the first block may comprise a polymerized unit derived from (meth)acrylic acid ester. In the present application, the term "polymerized unit" may mean a state where the predetermined monomer is polymerized and included in the main chain or side chains of a resin, a polymer or a polymerization reactant formed by polymerizing one or more predetermined monomers.

As the (meth)acrylic acid ester used for forming the first block, for example, alkyl (meth)acrylate may be used. In consideration of cohesive force, glass transition temperature and tackiness control, or the like, alkyl (meth)acrylate having an alkyl group of 1 to 20 carbon atoms, 1 to 16 carbon atoms, 1 to 12 carbon atoms, 1 to 8 carbon atoms or 1 to 4 carbon atoms may be used. An example of such a monomer may include methyl (meth)acrylate, ethyl (meth)

acrylate, n-propyl (meth)acrylate, isopropyl (meth)acrylate, n-propyl (meth)acrylate, isopropyl (meth)acrylate, n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth) acrylate and lauryl (meth)acrylate, and the like, and one or two or more of the foregoing may be selected and used, so that the glass transition temperature is secured.

In one example, the first block may comprise a cross-linkable functional group. When it comprises a cross-linkable functional group, it is advantageous to ensure durability of a pressure-sensitive adhesive. For example, the first block may comprise a polymerized unit derived from 80 to 99.9 parts by weight of a (meth)acrylic acid ester and a polymerized unit derived from 0.1 to 20 parts by weight of a compound capable of providing a cross-linkable functional group. More specifically, the first block may comprise a polymerized unit derived from 80 to 99 parts by weight of a (meth)acrylic acid ester, and a polymerized unit derived from 1 to 20 parts by weight of a compound capable of providing a cross-linkable functional group. In the present application, the "part by weight" may mean a weight ratio between the respective components. For example, as above, the phrase that the first block comprises a polymerized unit derived from 80 to 99.9 parts by weight of a (meth)acrylic acid ester and a polymerized unit derived from 0.1 to 20 parts by weight of a compound capable of providing a cross-linkable functional group may mean the case that the ratio (A:B) based on the weight of the (meth)acrylic acid ester monomer (A) and the compound (B) capable of providing a cross-linkable functional group, forming the polymerized units of the first block is 80 to 99.9:0.1 to 20.

When the first block, which is a hard segment, comprises the cross-linkable functional group as above, it is advantageous to improve interface adhesive force through cohesive force control. Also, the first block comprising the cross-linkable functional group can provide excellent high-temperature endurance reliability and stress relaxation properties to the pressure-sensitive adhesive even under high temperature condition at 100° C. or more. In addition, the pressure-sensitive adhesive comprising the first block can maintain excellent light leakage prevention characteristics of the optical film.

In the present application, the second block having a relatively low glass transition temperature can form a soft segment having a relatively soft physical property in the block copolymer. The second block may have molecular flowability at room temperature, and may serve to impart stress relaxation property to the pressure-sensitive adhesive comprising the block copolymer.

If the block having a glass transition temperature in the above range can be formed and the relational expression for the refractive index can be satisfied, the kind or content of the monomer for forming the second block is not particularly limited.

In one example, the second block may comprise a polymerized unit derived from a (meth)acrylic acid ester. As the (meth)acrylic acid ester used for forming the second block, for example, as in the first block, an alkyl (meth)acrylate having an alkyl group with 1 to 20 carbon atoms, 1 to 16 carbon atoms, 1 to 12 carbon atoms, 1 to 8 carbon atoms or 1 to 8 carbon atoms can be used. The content of the (meth)acrylic acid ester used in forming the second block is not particularly limited, but, for example, polymerized units derived from 20 to 99.9 parts by weight of the (meth)acrylic acid ester may be included in the second block.

In one example, the second block may comprise a cross-linkable functional group. When the cross-linkable functional group is included in the second block, the block copolymer exhibits appropriate cohesive force and stress relaxation property depending on the temperature change, so that a pressure-sensitive adhesive that physical properties required in an optical film, such as interface adherence, high-temperature endurance reliability, light leakage prevention property and re-workability, are kept excellent can be formed. The kinds of the cross-linkable functional groups may be the same as those described above.

In one example, the first block and/or the second block may comprise a cross-linkable functional group. Specifically, the first block and/or the second block may have a polymerized unit derived from a compound of the following formula 1 capable of providing a cross-linkable functional group.

[Formula 1]

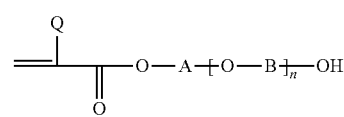

In Formula 1 above, Q is hydrogen or an alkyl group, A and B are each independently an alkylene group or an alkylidene group, and n is an integer in a range of 0 to 10. Also, when two or more [—O—B—] units in Formula 1 are present, the carbon number of B in each [—O—B—] unit may be the same or different.

In this specification, the term alkyl group may mean a linear, branched or cyclic alkyl group having 1 to 20 carbon atoms, 1 to 16 carbon atoms, 1 to 12 carbon atoms, 1 to 8 carbon atoms or 1 to 4 carbon atoms, unless otherwise specified and the alkyl group may be optionally substituted with one or more substituents. In Formula 1, as the alkyl group, a linear or branched alkyl group having 1 to 12 carbon atoms, 1 to 8 carbon atoms or 1 to 4 carbon atoms may be exemplified. In Formula 1 above, when Q is an alkyl group, the Q may be an alkyl group having 1 to 4 carbon atoms, although it is not particularly limited.

In this specification, the term alkylene group or alkylidene group may mean a linear, branched or cyclic alkylene group or alkylidene group having 1 to 20 carbon atoms, 1 to 16 carbon atoms, 1 to 12 carbon atoms, 1 to 8 carbon atoms or 1 to 4 carbon atoms, unless otherwise specified, which may optionally be substituted with one or more substituents. In Formula 1, for example, A and B may be each independently a linear alkylene group having 1 to 12 carbon atoms, 1 to 8 carbon atoms, or 1 to 4 carbon atoms.

Furthermore, n in Formula 1 may be, for example, 0 to 7, 0 to 5, 0 to 3 or 0 to 2.

As one example of the compound of Formula 1, 2-hydroxyethyl (meth)acrylate, 2-hydroxypropyl (meth)acrylate, 4-hydroxybutyl (meth)acrylate, 6-hydroxyhexyl (meth) acrylate, 8-hydroxyoctyl (meth)acrylate, 2-hydroxyethylene glycol (meth)acrylate or 2-hydroxypropylene glycol (meth) acrylate, and the like may be exemplified, but is not particularly limited to the compounds listed above.

In one example, the same compound represented by Formula 1 above may be used to form the first block and the second block. For example, the first block and the second block may each comprise a unit derived from the same hydroxyalkyl methacrylate, more specifically, hydroxyethyl methacrylate. Alternatively, the first block and the second block may each comprise a unit derived from the same hydroxyalkyl acrylate, more specifically, hydroxyethyl acrylate.

In one example, the compounds represented by Formula 1 above and different from each other may each be used to form the first block and the second block. For example, the first block may contain a unit derived from a hydroxyalkyl methacrylate such as hydroxyethyl methacrylate, and the second block may contain a unit derived from a hydroxyalkyl acrylate such as hydroxyethyl acrylate or hydroxybutyl acrylate.

When the compound of Formula 1 above is used in the first block and/or the second block, monomers (e.g.: (meth) acrylic acid esters, compounds capable of providing a cross-linkable functional group, or compounds capable of providing an aromatic group as described below) for forming each block may be selected so as to satisfy the relational expression regarding the refractive index. For example, when a hydroxyalkyl methacrylate, such as hydroxyethyl methacrylate (HEMA), which has a cross-linkable functional group and is advantageous for improving the durability of the pressure-sensitive adhesive, is used in the first block, the homopolymer of the monomer has a relatively high refractive index, and thus in order for the block copolymer to satisfy the relational expression regarding the refractive index, the monomer used for forming the second block also needs to be selected as a monomer that its homopolymer has a high refractive index. For example, in the compound of Formula 1 used for forming the second block, the use of a hydroxyalkyl acrylate such as hydroxyethyl acrylate or hydroxybutyl acrylate may be considered.

In one example, two or more compounds represented by Formula 1 above may be used for forming each block. That is, the first block or the second block may comprise two or more polymerized units derived from the compound represented by Formula 1 above. For example, the second block may comprise polymerized units derived from both hydroxyalkyl methacrylate and hydroxyalkyl acrylate. Alternatively, the second block may comprise both of units derived from two hydroxyalkyl acrylates, for example, hydroxybutyl acrylate and hydroxyethyl acrylate.

In one example, the first block may comprise two or more compounds in which the carbon numbers of A or B, or the carbon number sums of A and B in the compound represented by Formula 1 are different from each other. In another example, the second block may comprise two or more compounds in which the carbon numbers of A or B, or the carbon number sums of A and B in the compound represented by Formula 1 are different from each other. For example, the content of the monomer (M1) having a larger carbon number of the compound represented by Formula 1 may be smaller than the content of the monomer (M2) having a low carbon number of the compound represented by Formula 1. Taking the second block as an example, the second block may comprise the polymerized unit derived from the monomer (M1), in which the carbon number of A, the carbon number of B or the carbon number combining the carbon numbers of A and B in the compound represented by Formula 1 is larger, in an amount less than that of the polymerized unit derived from the monomer (M2) having the low carbon number. The monomer (M1) having a larger carbon number has faster reactivity to a cross-linking agent than the monomer (M2), so that when the monomer (M1) is added in a relatively excessive amount, durability at high-temperature and/or high-humidity conditions may be reduced, as overcuring occurs. For example, when 0.5 to 5 parts by weight of the monomer (M1) is used, the monomer (M2) may be used in a relatively excessive amount over the monomer (M1) within the range of 0.5 to 10 parts by weight.

In one example, when A and B are linear alkylidene groups or alkylene groups, the carbon numbers of A and B contained in the polymerized unit derived from Formula 1 contained in each block may be different from each other. Specifically, the sum of the carbon numbers of the alkylene groups of A and B contained in the polymerized unit derived from Formula 1 in which the second block comprises (hereinafter, the side chain carbon number of the second block) may be greater than or equal to the sum of the carbon numbers of the alkylene groups of A and B contained in the polymerized unit derived from Formula 1 in which the first block comprises (hereinafter, the side chain carbon number of the first block). For example, when the sum of the carbon numbers of A and B in the polymerized unit derived from Formula 1 in which the second block comprises is 4 to 10, the sum of the carbon numbers of A and B in the polymerized unit derived from Formula 1 in which the first block comprises may be 4 or less, for example, from 1 to 3. Here, upon calculating the side chain carbon numbers of the first block and the second block, only the carbon number contained in the linear chain alkylene group or alkylidene group is taken into consideration even when the substituent containing other carbon is substituted for the linear chain alkylene groups or alkylidene groups of A and B above. The inventors of the present application have found that when the sum of the carbon numbers of the alkylene group or alkylidene group of A and B contained in the polymerized unit derived from Formula 1 in which the second block comprises is larger than that of the first block as above, the reactivity of the second block, which is a soft block, is fast and the cross-linked structure formed by the soft block can contribute to realizing the cohesive force of the pressure-sensitive adhesive. In addition, the cross-linking of the first block formed somewhat late can provide good interface adhesive force for the above reasons. Specifically, after the soft block forms a cross-linked structure, the remaining curing agent or cross-linking agent forms a cross-linked structure on the interface of an optical member, which is an adherend, together with the cross-linkable functional group of the hard block having slow reactivity, whereby good interface adhesive force between the pressure-sensitive adhesive and the optical member, which is an adherend, can be provided. The cross-linking property of such a first block enables the pressure-sensitive adhesive to have some degree of excellent stress relaxation property while maintaining high-temperature durability under high-temperature and high-humidity conditions.

In another example, the second block may simultaneously comprise a cross-linkable functional group and an aromatic group. Specifically, the second block may comprise the above-described cross-linkable functional group or the polymerized unit derived from Formula 1 and may comprise a polymerized unit derived from a compound capable of providing an aromatic group simultaneously.

The compound capable of providing an aromatic group in the second block may be, for example, a compound containing a vinyl group and an aromatic group. The type of such a compound may be, for example, styrene or a compound corresponding to Formula 2 below.

In one example, the compound containing a vinyl group and an aromatic group may be represented by Formula 2 below.

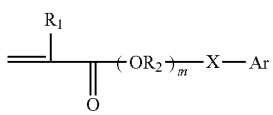

[Formula 2]

In Formula 2 above, R1 is hydrogen or an alkyl group, R2 is an alkylene group or an alkylidene group, m is an integer of 0 to 5, X is a single bond, an oxygen atom or a sulfur atom, and Ar is an aryl group. The single bond regarding X means, as the case where there is no separate atom in the moiety connected with X, for example, the case where R2 and Ar are directly connected.

The aryl group regarding Formula 2 means a monovalent residue derived from a compound or a derivative thereof containing benzene or a structure in which two or more benzenes are condensed or bonded. The aryl group may be, for example, an aryl group having 6 to 22 carbon atoms, 6 to 16 carbon atoms, or 6 to 13 carbon atoms, and for example, may be a phenyl group, a phenylethyl group, a phenylpropyl group, a benzyl group, a benzyloxy group, a phenoxy group, a tolyl group, a xylyl group, a phenylthio group, a naphthyl group or a naphthyloxy group, and the like.

Then, in Formula 2, m may be, for example, 0 to 4, 0 to 3, 0 to 2, or 0 or 1.

As the compound of Formula 2, phenoxyethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, and the like may be exemplified.

In one example, when the aromatic group is included in the second block, the aromatic group may not be included in the first block, but may be included only in the second block. When the aromatic group is included in the second block, the pressure-sensitive adhesive can be formed in which the aromatic group is appropriately oriented in a certain direction and the light leakage prevention property is maintained excellently. Especially, when the pressure-sensitive adhesive is exposed to high temperature or high temperature and high humidity condition, optical compensation may be made by an aromatic group to reduce light leakage phenomenon.

In one example, the second block may comprise a polymerized unit derived from 20 to 98 parts by weight of the (meth)acrylic acid ester, a polymerized unit derived from 1 to 40 parts by weight of a compound capable of providing a cross-linkable functional group, and a polymerized unit derived from 1 to 40 parts by weight of a compound capable of providing an aromatic group. Specifically, the second block may comprise 30 parts by weight or more, 40 parts by weight or more, 50 parts by weight or more, 60 parts by weight or more, 70 parts by weight or more, or 80 parts by weight or more of the polymerized unit derived from the (meth)acrylic acid ester, and the second block may comprise 95 parts by weight or less, or 90 parts by weight or less of the polymerized units derived from the (meth)acrylic acid ester. The second block may comprise the polymerized unit derived from the compound capable of providing a cross-linkable functional group in an amount of 1 part by weight or more, 3 parts by weight or more, or 5 parts by weight or more, and may comprise it in an amount of 30 parts by weight or less, 20 parts by weight or less, 15 parts by weight or less, or 10 parts by weight or less. In addition, the second block may comprise the polymerized unit derived from the compound capable of providing an aromatic group in an amount of 1 part by weight or more, 3 parts by weight or more, 5 parts by weight or more, 10 parts by weight or more, 15 parts by weight or more, or 20 parts by weight or more, and may comprise it in an amount of 30 parts by weight or less, or 25 parts by weight or less. When the content of the compound constituting the second block satisfies the above range, it is possible to provide a pressure-sensitive adhesive capable of minimizing light leakage while ensuring physical properties such as interface adherence, high-temperature endurance reliability and proper cohesive force.

In one example, the second block and/or the first block may comprise, as the polymerized unit derived from the (meth)acrylic acid ester, an alkyl (meth)acrylate having an alkyl group with 1 to 4 carbon atoms.

In one example, the first block and/or the second block may comprise a polymerized unit derived from 99 parts by weight or less of the alkyl (meth)acrylate having an alkyl group with 1 to 4 carbon atoms. For example, the polymerized unit derived from 98 parts by weight or less, 97 parts by weight or less, or 96 parts by weight or less, specifically 95 parts by weight or less, 90 parts by weight or less, or 85 parts by weight or less of the alkyl (meth)acrylate having an alkyl group with 1 to 4 carbon atoms may be included. The content lower limit of the alkyl (meth)acrylate having an alkyl group with 1 to 4 carbon atoms is not particularly limited, but may be, for example, 20 parts by weight or more, 30 parts by weight or more, 40 parts by weight or more, 50 parts by weight or more, 60 parts by weight or more, or 70 parts by weight or more. When the first block and/or the second block comprises the alkyl (meth)acrylate monomer having an alkyl group with 1 to 4 carbon atoms in the above range, it may further contribute to improving high-temperature durability of the pressure-sensitive adhesive. Specifically, the alkyl (meth)acrylate having an alkyl group with 1 to 4 carbon atoms can be more easily entangled than the alkyl (meth)acrylate having an alkyl group with 5 or more carbon atoms, so that the physical cross-linking that can substitute for chemical cross-linking can be sufficiently imparted to the pressure-sensitive adhesive resin, thereby providing a pressure-sensitive adhesive layer having excellent high-temperature durability. At this time, one or more of the alkyl (meth)acrylates having an alkyl group with 1 to 4 carbon atoms can be used for the first block and/or the second block.

In one example, the first block and/or the second block may comprise a polymerized unit derived from an alkyl (meth)acrylate having an alkyl group with 1 to 3 carbon atoms, a polymerized unit derived from an alkyl (meth)acrylate having an alkyl group with 4 or more carbon atoms and a polymerized unit derived from a compound capable of providing a cross-linkable functional group. The used content of the alkyl (meth)acrylate having 1 to 3 carbon atoms and the alkyl (meth)acrylate having an alkyl group with 4 or more carbon atoms may be, for example, within the range of the content of the (meth)acrylic acid ester monomer described above. Specifically, within the range of 20 to 99.9 parts by weight when used in each block, the content of the alkyl (meth)acrylate having 1 to 3 carbon atoms may be 60 parts by weight or more, 65 parts by weight or more, 70 parts by weight or more, 75 parts by weight or more, or 80 parts by weight or more. In addition, the content of the alkyl (meth)acrylate having an alkyl group with 4 or more carbon atoms may be 10 parts by weight or more, 20 parts by weight or more, 30 parts by weight or more, 40 parts by weight or more, 50 parts by weight or more, 60 parts by weight or more, 70 parts by weight or more, or 80 parts by weight or more. The polymerized unit derived from the compound capable of providing a cross-linkable functional group may be appropriately adjusted according to the content of other components. In an embodiment, the first block may comprise a polymerized unit derived from the alkyl (meth)acrylate having an alkyl group with 1 to 3 carbon atoms, a polymerized unit derived from the alkyl (meth)acrylate having an alkyl group with 4 or more carbon atoms and a polymerized unit derived from the compound capable of providing a cross-linkable functional group, as described above.

In one example, the second block may comprise a polymerized unit derived from an alkyl (meth)acrylate having an alkyl group with 1 to 4 carbon atoms, a polymerized unit derived from a compound capable of providing a cross-linkable functional group and a polymerized unit derived from a compound capable of providing an aromatic group. The used content of the alkyl (meth)acrylate having an alkyl group with 1 to 4 carbon atoms may be, for example, within the range of the content of the (meth)acrylic acid ester monomer described above. Specifically, within the range of 20 to 99.9 parts by weight when used in each block, the content of the alkyl (meth)acrylate having 1 to 4 carbon atoms may be 60 parts by weight or more, 65 parts by weight or more, 70 parts by weight or more, 75 parts by weight or more, or 80 parts by weight or more. The polymerized unit derived from the compound capable of providing a cross-linkable functional group and the polymerized unit derived from the compound capable of providing an aromatic group can be appropriately adjusted according to the content of other components.

In one example, the second block may comprise a polymerized unit derived from an alkyl (meth)acrylate having an alkyl group with 4 or more carbon atoms, a polymerized unit derived from a compound capable of providing a cross-linkable functional group and a polymerized unit derived from a compound derived from a compound capable of providing an aromatic group. The used content of the alkyl (meth)acrylate having an alkyl group with 4 or more carbon atoms may be, for example, within the range of the content of the (meth)acrylic acid ester monomer described above. Specifically, within the range of 20 to 99.9 parts by weight when used in each block, the content of the alkyl (meth)acrylate having 1 to 4 carbon atoms may be 60 parts by weight or more, 65 parts by weight or more, 70 parts by weight or more, 75 parts by weight or more, or 80 parts by weight or more. The polymerized unit derived from the compound capable of providing a cross-linkable functional group and the polymerized unit derived from the compound capable of providing an aromatic group can be appropriately adjusted according to the content of other components.

In one example, the second block may comprise a polymerized unit derived from an alkyl (meth)acrylate having an alkyl group with 1 to 4 carbon atoms, a polymerized unit derived from an alkyl (meth)acrylate having an alkyl group with 5 or more carbon atoms, a polymerized unit derived from a compound capable of providing a cross-linkable functional group and a polymerized unit derived from a compound capable of providing an aromatic group. At this time, the content between the monomers or compounds used to form the second block may be adjusted within the same range as in the content range between the polymerized units derived from the monomers or compounds described above with respect to the second block composition.

In one example, the first block in the block copolymer may have a number average molecular weight (Mn) in a range of 10,000 to 250,000. The number average molecular weight of the first block may be, for example, a number average molecular weight of a polymer prepared by polymerizing only a monomer forming the first block. The number average molecular weight referred to in the present application can be measured, for example, using GPC (gel permeation chromatograph) according to the method given in examples. More specifically, the lower limit of the number average molecular weight (Mn) of the first block may be, for example, 10,000 or more, 15,000 or more, 20,000 or more, 25,000 or more, 30,000 or more, 35,000 or more, 40,000 or more, 45,000 or more, 50,000 or more, or 60,000 or more. Then, the upper limit may be 250,000 or less, 200,000 or less, 180,000 or less, 150,000 or less, 130,000 or less, 100,000 or less, 90,000 or 80,000 or less.

In another example, the ratio (Mw/Mn) of the weight average molecular weight (Mw) and the number average molecular weight (Mn) of the first block, that is, the molecular weight distribution (PDI=Mw/Mn) may be in a range of 1.0 to 3.0. More specifically, the PDI value lower limit of the first block may be 1.0 or more, 1.1 or more, 1.2 or more, 1.3 or more, 1.4 or more, or 1.5 or more, and the upper limit may be 3.0 or less, 2.8 or less, 2.6 or less, 2.4 or less, or 2.2 or less.

In one example, the block copolymer may have a number average molecular weight (Mn) of 500,000 or less. More specifically, the lower limit of the number average molecular weight (Mn) of the block copolymer may be, for example, 100,000 or more, 110,000 or more, 120,000 or more, 130,000 or more, 140,000 or more, 150,000 or more, 160,000 or more, 170,000 or more, 180,000 or more, 190,000 or more, 200,000 or more, 210,000 or more, or 220,000 or more. Then, the upper limit may be 500,000 or less, 450,000 or less, 400,000 or less, 350,000 or less, or 300,000 or less.

In another example, the molecular weight distribution (PDI=Mw/Mn) of the block copolymer may be in a range of 2.0 to 5.0. More specifically, the lower limit of the molecular weight distribution of the block copolymer may be, for example, 2.0 or more, 2.1 or more, 2.3 or more, or 2.5 or more, and the upper limit thereof may be, for example, 5.0 or less, 4.8 or less, 4.6 or less, 4.4 or less, 4.2 or 4.0 or less.

As described above, when the molecular weight characteristics of the block copolymer are adjusted, a pressure-sensitive adhesive that physical properties required in an optical film, such as interface adherence, high-temperature endurance reliability, light leakage prevention property and re-workability, are kept excellent can be formed.

In one example, the block polymer of the present application may comprise 5 parts by weight to 50 parts by weight of the first block having the above configuration and 50 parts by weight to 95 parts by weight of the second block having the above configuration.

In another example, the block copolymer may comprise an excess of a second block. Specifically, the block copolymer may comprise 10 parts by weight to 30 parts by weight of the first block having the above configuration and 70 parts by weight to 90 parts by weight of the second block having the above configuration. In another example, the block polymer of the present application may comprise 10 parts by weight to 20 parts by weight of the first block having the above configuration and 80 parts by weight to 90 parts by weight of the second block having the above configuration.

In another example, considering durability, the first block may be used in an amount of 10 parts by weight or more, 15 parts by weight or more, or 25 parts by weight or more within the above range.

The first block and/or the second block may further comprise any comonomer as needed, where the monomer may be included in each block as the polymerized unit. The comonomer may include a nitrogen-containing monomer such as (meth)acrylonitrile, (meth)acrylamide, N-methyl (meth)acrylamide, N-butoxymethyl (meth)acrylamide, N-vinyl pyrrolidone or N-vinyl caprolactam; an alkylene oxide group-containing monomer such as an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetraalkyleneglycol (meth)acrylic acid ester, an alkoxy polyethyleneglycol (meth)acrylic acid ester, a phenoxy alkyleneglycol (meth) acrylic acid ester, a phenoxy dialkyleneglycol (meth)acrylic acid esters, a phenoxy trialkyleneglycol (meth)acrylic acid ester, a phenoxy tetralkyleneglycol (meth)acrylic acid ester or a phenoxy polyalkylene glycol (meth)acrylic acid ester; a styrenic monomer such as styrene or methylstyrene; a glycidyl group-containing monomer such as glycidyl (meth) acrylate; or a carboxylic acid vinyl ester such as vinyl acetate, and the like, but is not limited thereto. These comonomers may be included in the polymer by selecting one or two or more of suitable types, if necessary. The polymerized unit derived from such a comonomer may be included in each block, for example, in a ratio of 20 parts by weight or less, or 0.1 parts by weight to 15 parts by weight.

The method for producing the block copolymer is not particularly limited, and a known method can be used. For example, the block polymer can be polymerized by an LRP (living radical polymerization) method. Specifically, an anionic polymerization method in which the polymer is synthesized in the presence of an inorganic acid salt such as an alkali metal or alkali earth metal by using an organic rare earth metal complex as a polymerization initiator or using an organic alkali metal compound as a polymerization initiator, an anionic polymerization method in which the polymer is synthesized in the presence of an organoaluminum compound by using an organic alkali metal compound as a polymerization initiator, an atomic transfer radical polymerization method (ATRP) using an atomic transfer radical polymerization agent as a polymerization controlling agent, an ARGET (activators regenerated by electron transfer) atomic transfer radical polymerization method (ATRP) using an atomic transfer radical polymerization agent as a polymerization controlling agent, but carrying out the polymerization under an organic or inorganic reducing agent that generates electrons, an ICAR (initiators for continuous activator regeneration) atomic transfer radical polymerization method (ATRP), a polymerization method (RAFT) by reversible addition-cleavage chain transfer using a reducing agent addition-cleavage chain transfer agent or a method using an organic tellurium compound as an initiator, and the like can be used, and among the methods, an appropriate method can be selected to prepare the block copolymer.

The pressure-sensitive adhesive composition of the present application may comprise one or more cross-linking agents capable of reacting with the cross-linkable functional group of the block copolymer to form a chemical cross-linking structure. Non-limiting examples of cross-linking agents may include isocyanate cross-linking agents, epoxy cross-linking agents, aziridine cross-linking agents or metal chelate cross-linking agents.

In one example, when the cross-linkable functional group is a hydroxy group, an isocyanate cross-linking agent may be used. Specifically, an isocyanate cross-linking agent having at least two functional groups capable of reacting with the cross-linkable functional group of the block copolymer may be used. As such an isocyanate cross-linking agent, for example, a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate; or a compound obtained by reacting the diisocyanate compound with a polyol may be used. As the polyol, trimethylolpropane or the like may be used.

In one example, the pressure-sensitive adhesive composition may comprise 0.01 to 20 parts by weight of a cross-linking agent relative to 100 parts by weight of the block copolymer. More specifically, the lower limit of the cross-linking agent content may be 0.05 parts by weight or more, or 0.10 parts by weight or more, and the upper limit may be 10 parts by weight or 5 parts by weight or less. The degree of cross-linking of the block copolymer can be appropriately controlled within the content range of the cross-linking agent, and accordingly the gel fraction, cohesive force, pressure-sensitive adhesive force and high-temperature durability, and the like of the pressure-sensitive adhesive can be maintained excellent.

The pressure-sensitive adhesive composition may comprise an epoxy silane compound. Compared with the use of other kinds of silane compounds without any epoxy group, the epoxy silane compounds can provide higher durability to the pressure-sensitive adhesive without interfering with the improvement of the optical properties that the present application intends to implement.

The kind of the epoxy silane compound is not particularly limited. In the present application, the epoxy silane compound may be a compound in which an epoxy group and an alkoxy group (—OR) are bonded to a Si atom. The epoxy group may be, as a substituted or unsubstituted epoxy group, for example, an alicyclic epoxy group such as an epoxidized C5 to C20 cycloalkyl group, a glycidyl group or a glycidoxy group unsubstituted or substituted with an alkyl group, and the like.

In one example, the epoxy silane compound may be represented by the following formula 3.

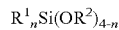     [Formula 3]

In Formula 3 above, $R^1$ is an epoxy group, $R^2$ is an alkyl group having 1 to 20 carbon atoms, and n is an integer of 1 to 3.

In one example, $R^2$ may be an alkyl group having 1 to 4 carbon atoms.

In one example, the epoxy silane compound is an epoxy-containing compound, where 2-(3,4-epoxycyclohexyl)ethyl trimethoxysilane, 2-(3,4-epoxycyclohexyl)ethyl triethoxysilane, 3-glycidoxypropyl trimethoxysilane, 3-glycidoxypropyl triethoxysilane, 3-glycidoxypropyl methyldimethoxysilane, or 3-glycidoxypropyl methyldiethoxysilane, and the like may be used, without being particularly limited thereto, and known epoxy silane compounds may be used.

In one example, the pressure-sensitive adhesive composition may comprise a silane coupling agent in a range of 0.01 to 5 parts by weight relative to 100 parts by weight of the block copolymer. Specifically, the silane coupling agent may be used in a content of 4 parts by weight or less, 3 parts by weight or less, 2 parts by weight or less, or 1 part by weight or less. Within the above range, the desired physical properties can be effectively imparted to the pressure-sensitive adhesive.

In one example, the pressure-sensitive adhesive composition of the present application may comprise a plasticizer. The plasticizer may impart stress relaxation property to the pressure-sensitive adhesive. The plasticizer of the present application can impart excellent pressure-sensitive adhesive force, re-detachability, light leakage relaxation and high-temperature durability to the pressure-sensitive adhesive by comprising polyalkylene glycol. Furthermore, when the plasticizer comprising polyalkylene glycol is used together with an antistatic agent as follows, the antistatic performance of the pressure-sensitive adhesive can be further improved. This is because the polyalkylene glycol can chelate the cationic group of the antistatic agent, and suppress the change over time of the antistatic performance, even when the pressure-sensitive adhesive is exposed to high temperature and/or high humidity conditions for a long time, by suppressing ion association of the antistatic agent and improving distribution uniformity of the antistatic agent.

In one example, the plasticizer may be represented by the following formula 4.

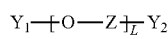

[Formula 4]

In Formula 4 above, Z may be an alkylene group having 2 to 8 carbon atoms. For example, Z may be an alkylene group having 2 to 4 carbon atoms.

In Formula 4 above, L may be a number between 2 and 50. For example, L may be 2 to 40, 2 to 30, 2 to 20, or 2 to 10.

In Formula 4 above, Y1 and Y2 are each independently hydrogen, a hydroxy group, an alkyl group, an alkoxy group, (C=O)R3 or (C=O)R4, provided that at least one of Y1 and Y2 is a functional group containing a carbonyl group. In one example, Y1, which is a functional group containing a carbonyl group, may be (C=O)R3, and Y2, which is a functional group containing a carbonyl group, may be O(C=O)R4.

In Formula 4 above, R3 and R4 may be each independently an alkyl group, an alkenyl group, or an aryl group. Here, the alkyl group may mean an alkyl group having 2 to 20 carbon atoms, 2 to 18 carbon atoms or 2 to 16 carbon atoms, and the alkenyl group may be an alkenyl group having 2 to 20 carbon atoms, 2 to 18 carbon atoms or 2 to 16 carbon atoms, and the aryl group may be an aryl group having 6 to 25 carbon atoms, 6 to 20 carbon atoms, 6 to 15 carbon atoms or 6 to 12 carbon atoms.

With respect to the plasticizers, the alkyl group, alkylene group or alkenyl group may designate a linear, branched, or cyclic alkyl group and may be optionally substituted with one or more substituents. Here, in the range of the alkyl group, a haloalkyl group, which is described below, may also be included.

With regard to the plasticizer, the aryl group may mean a monovalent residue derived from benzene, a compound comprising a benzene structure, or derivatives of any of the foregoing. A specific kind of the aryl group may be exemplified by a phenyl group, a benzyl group, a biphenyl group or a naphthalenyl group, and the like, but is not limited thereto. Furthermore, in the category of the aryl group, a so-called aralkyl group or arylalkyl group, and the like as well as a functional group typically called an aryl group may also be included.

With regard to the plasticizer, the substituent which may optionally be substituted on the alkyl group and the like may be exemplified by halogen such as chlorine or fluorine, a haloalkyl group, an epoxy group such as a glycidyl group, a glycidylalkyl group, a glycidoxyalkyl group or an alicyclic epoxy group, an acryloyl group, a methacryloyl group, an isocyanate group, a thiol group, an alkyl group, an alkoxy group or an aryl group, and the like, but is not limited thereto.

Among the plasticizers represented by Formula 4 above, one or more plasticizers may be used.

The specific kind of the plasticizer is not particularly limited. For example, as the plasticizer, polyethylene glycol bis(2-ethylhexanoate), polypropylene glycol bis(2-ethylhexanoate), polyethylene glycol monooleate, polypropylene glycol monooleate, polyethylene glycol dioleate, polypropylene glycol dioleate, polyethylene glycol dibenzoate, polypropylene glycol dibenzoate, polyethylene glycol monolaurate, polypropylene glycol monolaurate, polyethylene glycol dilaurate, polypropylene glycol dilaurate, polyethylene glycol distearate, polypropylene glycol distearate, polyethylene glycol monostearate or polypropylene glycol monostearate may be used.

The plasticizer may have, for example, a number average molecular weight (Mn) of 100 to 1,000. The lower limit of the number average molecular weight of the plasticizer may be, for example, 200 or more, 300 or more, or 400 or more. The upper limit of the number average molecular weight of the plasticizer may be, for example, 900 or less, 800 or less, or 700 or less. When the number average molecular weight of the plasticizer satisfies the above range, the pressure-sensitive adhesive having excellent in stress relaxation characteristics and high-temperature durability can be provided.

The plasticizer may be included in an amount of 0.01 to 10 parts by weight relative to 100 parts by weight of the block copolymer. The lower limit of the content of the plasticizer may be, for example, 0.1 parts by weight or more, 1 part by weight or more, or 1.5 parts by weight or more. The upper limit of the content of the plasticizer may be, for example, 7 parts by weight or less, 5 parts by weight or less, or 3 parts by weight or less. By adjusting the content of the plasticizer within the above range, it is possible to provide a pressure-sensitive adhesive composition having excellent re-detachability and high-temperature durability.

The pressure-sensitive adhesive composition of the present application may further comprise an antistatic agent. As the antistatic agent, for example, an ionic compound may be used. As the ionic compound, an organic salt or an inorganic salt may be exemplified.

As the inorganic salt, for example, a metal salt containing a metal ion as a cation may be used. The metal salt may comprise, for example, an alkali metal cation or an alkaline earth metal cation. The cation may be exemplified by one or two or more of lithium ion ($Li^+$), sodium ion ($Na^+$), potassium ion ($K^+$), rubidium ion ($Rb^+$), cesium ion ($Cs^+$), beryllium ion ($Be^{2+}$), magnesium ion ($Mg^{2+}$)), calcium ion ($Ca^{2+}$), strontium ion ($Sr^{2+}$) and barium ion ($Ba^{2+}$), and the like.

As the organic salt, for example, an ionic compound containing an organic cation may be used. As the organic cation, an onium cation may be exemplified. In this specification, the term onium cation may mean a positively (+) charged ion comprising a structure in which at least some of charges are localized to an atom such as nitrogen (N), phosphorus (P) and/or sulfur (S). The onium cation may be a cyclic or acyclic compound, and when it is cyclic, it may be an aromatic or non-aromatic compound. The onium cation may further comprise other atoms such as oxygen or carbon atoms in addition to the nitrogen, phosphorus and/or sulfur. The onium cation may be optionally substituted with a substituent such as halogen, an alkyl group or an aryl group. For example, the acyclic compound may include one or four or more substituents, where the substituent may be a cyclic or acyclic substituent, or an aromatic or non-aromatic substituent.

The onium cation may be exemplified by, for example, a quaternary ammonium ion such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, phosphonium, pyridinium, imidazolium, pyrolidinium or piperidinium, and the like.

The anion included in an ionic compound such as an inorganic salt and an organic salt may be exemplified by, for example, $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzene sulfonate ($CH_3(C_6H_4)SO_3^-$), p-toluene sulfonate ($CH_3C_6H_4SO_3^-$), tetraborate ($B_4O_7^{2-}$), carboxybenzene sulfonate ($COOH(C_6H_4)SO_3^-$), floromethane sulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_4)_4^-$) or trispentafluoroethyl trifluorophosphate ($P(C_2F_5)_3F_3^-$), and the like.

In another example, as the anion, an anion or bifluorosulfonylimide represented by Formula 5 below, and the like may also be used.

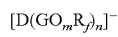  [Formula 5]

In Formula 5, D is a nitrogen atom or a carbon atom, G is a carbon atom or a sulfur atom, $R_f$ is a perfluoroalkyl group, m is 1 or 2, and n is 2 or 3.

In Formula 5, when G is carbon, m may be 1; when G is sulfur, m may be 2; when D is nitrogen, n may be 2; and when D is carbon, n may be 3.

The anion or bis(fluorosulfonyl)imide of Formula 5 exhibits high electronegativity due to the perfluoroalkyl group ($R_f$) or the fluorine group, and also contains a specific resonance structure, thereby forming a weak bond with the cation and simultaneously having hydrophobicity. Accordingly, the ionic compound can impart high antistatic characteristics thereto even in a small amount, while exhibiting excellent compatibility with other components of the composition such as a polymer.

Rf in Formula 5 may be a perfluoroalkyl group having 1 to 20 carbon atoms, 1 to 12 carbon atoms, 1 to 8 carbon atoms or 1 to 4 carbon atoms, where the perfluoroalkyl group may have a linear, branched or cyclic structure. The anion of Formula 5 may be a sulfonymethide-, sulfonylimide-, carbonylmethide- or carbonylimide-based anion, and specifically, one or a mixture of two or more of tristrifluoromethane sulfonylmethide, bistrifluoromethane sulfonylimide, bisperfluorobutane sulfonylimide, bispentafluoroethane sulfonylimide, tristrifluoromethane carbonylmethide, bisperfluorobutane carbonylimide or bispentafluoroethane carbonylimide, and the like.

The ratio of the antistatic agent can be adjusted in consideration of the desired antistatic property and the like.

In one example, the composition comprises 0.1 to 20 parts by weight, 0.1 to 15 parts by weight, 0.1 to 10 parts by weight, 0.1 to 5 parts by weight, 0.1 to 3 parts by weight, or 0.5 to 3 parts by weight of an antistatic agent relative to 100 parts by weight of the block copolymer.

The pressure-sensitive adhesive composition may further comprise a tackifier, if necessary. As the tackifier, for example, one or a mixture of two or more of a hydrocarbon resin or hydrogenated product thereof, a rosin resin or hydrogenated product thereof, a rosin ester resin or hydrogenated product thereof, a terpene resin or hydrogenated product thereof, a terpene phenol resin or hydrogenated product thereof, a polymerized rosin resin or a polymerized rosin ester resin, and the like, may be used, but is not limited thereto. The tackifier may be included in the pressure-sensitive adhesive composition in an amount of 100 parts by weight or less relative to 100 parts by weight of the block copolymer.

Besides, the pressure-sensitive adhesive composition may further comprise additives such as an epoxy resin, a curing agent, an ultraviolet stabilizer, an antioxidant, a toning agent, a reinforcing agent, a filler, a defoaming agent, a surfactant or a plasticizer. The specific kind or content of the additive is not particularly limited.

In one example regarding the present application, the pressure-sensitive adhesive composition may be a pressure-sensitive adhesive composition for a protective film. The protective film can be used, for example, for protecting the surface of various optical films.

In another example regarding the present application, the pressure-sensitive adhesive composition may be a pressure-sensitive adhesive composition for an optical film. For example, the pressure-sensitive adhesive composition for an optical film can be used as a use for laminating optical films such as a polarizing film, a retardation film, an anti-glare film, a wide viewing angle compensation film or a luminance enhancement film to each other, or attaching the optical film or laminate thereof to an adherend. In one example, the pressure-sensitive adhesive composition may be a pressure-sensitive adhesive composition used as a use for attaching a polarizing film to a liquid crystal panel as a pressure-sensitive adhesive composition for a polarizing plate.

The present application relates to a pressure-sensitive adhesive optical laminate. An exemplary optical laminate may comprise an optical film; and a pressure-sensitive adhesive layer present on at least any one side of the optical film. The pressure-sensitive adhesive layer may be, for example, a pressure-sensitive adhesive layer for attaching the optical film to a liquid crystal panel or the like of an LCD device or other optical films. Also, the pressure-sensitive adhesive layer may comprise the pressure-sensitive adhesive composition of the present invention as described above. The pressure-sensitive adhesive composition may be contained in the pressure-sensitive adhesive layer in a state of realizing a cross-linked structure. Here, the optical film may be exemplified by a polarizing plate, a polarizer, a retardation film or a luminance enhancement film, and the like, or a laminate in which two or more of the foregoing are laminated. In this specification, the term polarizing plate and polarizer designate objects that are distinguished from each other. That is, the polarizer designates a film, sheet or element itself exhibiting a polarization function, and polarizing plate means an optical element comprising other components together with the polarizer. Other elements that can be included in the optical element together with the polarizer can be exemplified by a polarizer protective film or a retardation layer, and the like, but is not limited thereto.

In one example, the optical film used in the pressure-sensitive adhesive optical laminate may be a polarizer. That is, the present application relates to a pressure-sensitive adhesive polarizing plate.

The type of the polarizer included in the polarizing plate is not particularly limited, and for example, general types known in the art, such as a polyvinyl alcohol-based polarizer, can be adopted without limitation.

A polarizer is a functional film capable of extracting only light oscillating in one direction from light incident while oscillating in various directions. Such a polarizer may be, for example, a form in which a dichroic dye is adsorbed and oriented on a polyvinyl alcohol-based resin film. The polyvinyl alcohol-based resin constituting the polarizer can be obtained by, for example, performing gelation of a polyvinyl acetate-based resin. In this case, the usable polyvinyl acetate-based resin may include not only homopolymers of vinyl acetate but also copolymers of vinyl acetate and other monomers copolymerizable therewith. Here, an example of the monomer copolymerizable with vinyl acetate may include one or a mixture of two or more of unsaturated carboxylic acids, olefins, vinyl ethers, unsaturated sulfonic acids, and acrylamides having an ammonium group, but is not limited thereto. The polyvinyl alcohol-based resin may have a gelation degree of, typically, about 85 mol % to 100 mol %, preferably, 98 mol % or more. The polyvinyl alcohol-based resin may also be further modified, and for example, polyvinyl formal or polyvinyl acetal modified into aldehydes, and the like may also be used. The polyvinyl alcohol-based resin may have a polymerization degree of, typically, 1,000 to 10,000 or so, or 1,500 to 5,000 or so.

The polarizer may be produced through a process of stretching the above polyvinyl alcohol-based resin film (e.g., uniaxially stretching), a process of dyeing the polyvinyl alcohol-based resin film with a dichroic dye and adsorbing the dichroic dye, a process of treating the polyvinyl alcohol-based resin film adsorbed by the dichroic dye with a boric acid aqueous solution and a process of washing after treating with the boric acid aqueous solution, and the like. Here, as the dichroic dye, iodine or a dichroic organic dye, and the like may be used.

The polarizing plate may comprise, in addition to the polarizer, a protective film and/or an optical functional film.

In one example, the polarizing plate may comprise a protective film attached to one side or both sides of the polarizer, and in this case, the pressure-sensitive adhesive layer may be formed on one or both sides of the protective film. In one example, the pressure-sensitive adhesive layer may be formed on the side opposite to the polarizer of the protective film. The kind of the protective film is not particularly limited, and for example, a film having a laminated structure of one or two or more layers, such as a cellulose-based film such as TAC (triacetyl cellulose); a polyester-based film such as a polycarbonate film or PET (poly(ethylene terephthalate)); a polyether sulfone-based film; or a polyethylene film, a polypropylene film or a polyolefin-based film produced by using a resin having a cyclo or norbornene structure, or an ethylene-propylene copolymer, and the like can be used. Considering the securing of moisture barrier characteristics, PET and polyolefin-based films can be used, and considering the securing of high-temperature durability, acrylic films can be used.

In one example, the polarizing plate may also further comprise one or more optical functional films selected from the group consisting of a reflective film, an antiglare film, a retardation film, a wide view angle compensation film and a luminance enhancement film.

In one example, the polarizing plate may comprise one or more wide viewing angle compensation films selected from a ±A film, a ±B film and a ±C film. In the present application, the 'A film' means a film, the refractive index of which satisfies nx≠ny=nz, where the case of nx>ny is called a ±A film and the case of nx<ny is called a −A film. The 'B film' means a film, the refractive index of which satisfies nx≠ny≠nz, where the case of nx>ny>nz is called a −B film and the case of nz>nx>ny is called a +B film. The 'C film' means a film, the refractive index of which satisfies nx=ny≠nz, where the case of ny<nz is called a +C film and the case of ny>nz is called a −C film. In this regard, nx means the refractive index of the slow axis direction in the plane direction of the film or plate, ny means the refractive index of the direction perpendicular to the slow axis in the plane direction of the film or plate, nz means the thickness direction refractive index of the film or plate.

In one example, the polarizing plate may comprise a retardation film. The retardation layer may include, for example, a quarter wave plate (QWP). The quarter wave plate may have quarter-wave phase delay characteristics. In this specification, the term n-wave phase delay characteristic means a characteristic that the incident light can be phase-delayed by n times the wavelength of the incident light within at least a part of the wavelength range. The quarter-wave phase delay characteristic may be a characteristic that the incident linearly polarized light is converted into elliptically polarized light or circularly polarized light and conversely, the incident linearly polarized light or circularly polarized light is converted into linearly polarized light. As the quarter wave plate, a quarter wave plate generally manufactured and distributed in the related technical field may be used. For example, uniaxially stretched cycloolefin-based films, uniaxially stretched polyethylene terephthalate films, uniaxially stretched polycarbonate films or liquid crystal films, and the like can be used without limitation.

The polarizing plate of the above configuration may have crossed nicol transmittance (Tc) of less than 0.002% and a polarization degree (P.E.) of 99.996 to 99.998%. When the above range is satisfied, the original polarization function can fully be exhibited.

In the present application, the method of forming the pressure-sensitive adhesive layer on the polarizing plate or the optical film is not particularly limited, and for example, a method of directly coating the pressure-sensitive adhesive composition on the polarizing plate or the like and curing it to realize a cross-linked structure can be used, or a method in which the pressure-sensitive adhesive composition is coated and cured on the release-treated surface of a release film to form a cross-linked structure and then transferred, and the like can be used.

The method of coating the pressure-sensitive adhesive composition is not particularly limited, and for example, a method of applying a pressure-sensitive adhesive composition by a conventional means such as a bar coater can be used.

In the coating process, the cross-linking agent contained in the pressure-sensitive adhesive composition is preferably controlled from the viewpoint of performing a uniform coating process so that the cross-linking reaction of the functional groups does not proceed, whereby the cross-linking agent may form a cross-linked structure in the curing and aging process after the coating operation to improve the cohesive force of the pressure-sensitive adhesive and to improve the pressure-sensitive adhesive physical properties and cuttability.

The coating process is also preferably performed after sufficiently removing the bubble-inducing component such as the volatile component or the reaction residue in the pressure-sensitive adhesive composition and accordingly, it is possible to prevent problems that the cross-linking density or molecular weight of the pressure-sensitive adhesive is too low to lower the elastic modulus, and bubbles existing between the glass plate and the pressure-sensitive adhesive layer at a high temperature state are enlarged to form scattering bodies therein, and the like.

The method of curing the pressure-sensitive adhesive composition after coating to realize a cross-linked structure is also not particularly limited. For example, a method of maintaining the coating layer at an appropriate temperature so that a cross-linking reaction between the block copolymer and the polyfunctional cross-linking agent contained in the coating layer can be induced.

In one example, the pressure-sensitive adhesive layer may have interface adhesive force to the polarizing plate of 1,500 gf/25 mm or more, 2,000 gf/25 mm or more, or 2,500 gf/25 mm or more as measured according to the following examples. The Interface adhesive force to the polarizing plate is a measure for evaluating an adhesiveness degree of the pressure-sensitive adhesive layer to the polarizing plate, and the higher the better. Although not particularly limited, the upper limit of the interface adhesive force may be 5,000 gf/25 mm or less, 4,500 gf/25 mm or less, or 4,000 gf/25 mm or less.

In one example, the pressure-sensitive adhesive layer may have peel force to the glass plate of 250 gf/25 mm or more, or 300 gf/25 mm or more as measured according to the following examples. Then, the upper limit thereof may be 1,000 gf/25 mm or less, 900 gf/25 mm or less, 800 gf/25 mm or less, 700 gf/25 mm or less, 600 gf/25 mm or less, 500 gf/25 mm or less, or 400 gf/25 mm or less. It means that when the peel force to the glass plate exceeds the above range, re-detachability required as needed by a process is not good, and when it is less than the above range, tackiness is not enough.

In one example, the pressure-sensitive adhesive polarizing plate comprising the pressure-sensitive adhesive layer may be a pressure-sensitive adhesive polarizing plate satisfying crossed nicol transmittance (Tc) of less than 0.002% and a polarization degree (P.E.) in the range of 99.996 to 99.998%. That is, since the pressure-sensitive adhesive layer of the above configuration satisfies the relational expression related to the refractive index of the block copolymer, it may not reduce the optical characteristics of the polarizing plate.

The present application also relates to a display device. When the display device is an LCD, the device may comprise a liquid crystal panel and the polarizing plate or optical laminate attached to one or both sides of the liquid crystal panel. The polarizing plate or optical laminate may be attached to the liquid crystal panel by the above-described pressure-sensitive adhesive.

The liquid crystal panel may comprise, for example, a first substrate, a pixel electrode, a first alignment film, a liquid crystal layer, a second alignment film, a common electrode, and a second substrate, which are sequentially formed. In one example, the first substrate and the second substrate may be glass substrates. In this case, the polarizing plate or optical laminate may be attached to the glass substrate via the above-described pressure-sensitive adhesive layer.

The device may further comprise a light source on the opposite side of the viewing side of the liquid crystal panel. In the first substrate on the light source side, for example, an active driving circuit comprising TFTs (thin film transistors) as a driving element electrically connected to the transparent pixel electrode and wiring, and the like may be formed. The pixel electrode comprises, for example, ITO (indium tin oxide) or the like, and can function as an electrode for each pixel. In addition, the first or second alignment film may comprise, for example, a material such as polyimide, but is not limited thereto.

As the liquid crystal panel in the device, for example, all the known panels of a passive matrix mode panel such as a TN (twisted nematic) type, an STN (super twisted nematic) type, an F (ferroelectic) type or a PD (polymer dispersed) type; an active matrix mode panel such as a two-terminal or a three-terminal type; a transverse electric field type (IPS: in plane switching) panel and a vertical alignment type (VA) panel, and the like may be applied.

Types of other configurations of the display device, for example, upper and lower substrates such as a color filter substrate or an array substrate in a liquid crystal display device, and the like are not particularly limited, and configurations known in this field can be adopted without limitation.

Advantageous Effects

According to one example of the present application, there is provided a pressure-sensitive adhesive composition that can provide excellent durability and excellent optical characteristics even at a high temperature of 100° C. or more and/or a high humidity condition of 65° C. and 95%, and a pressure-sensitive adhesive optical laminate comprising the same.

BRIEF DESCRIPTION OF DRAWINGS

The FIGURE is a view for explaining a light leakage measurement method in Examples and Comparative Examples.

BEST MODE

Hereinafter, the present application will be described in detail through examples. However, the protection scope of the present application is not limited by examples described below.

<Measurement or Evaluation Items>

1. Molecular Weight

The number average molecular weight (Mn) and the molecular weight distribution (PDI) of the block or block copolymer were measured using GPC (gel permeation chromatograph), and the GPC measurement conditions were as follows. The measurement results were converted using standard polystyrene (manufactured by Aglient system) for preparing the calibration curve.

<GPC measurement conditions>
  Measuring instrument: Aglient GPC (Aglient 1200 series, U.S.)
  Column: Two PL Mixed B connected
  Column temperature: 40° C.
  Eluent: THF (tetrahydrofuran)
  Flow rate: 1.0 mL/min
  Concentration: ~1 mg/mL (100 μl injection)

2. Durability

The polarizing plates prepared in Examples and Comparative Examples were each tailored to have a width of about 106 mm and a length of about 142 mm, and attached to a 7-inch commercial liquid crystal panel. Thereafter, the panel with the attached polarizing plate is stored for about 20 minutes in an autoclave (50° C., 5 atm) to prepare a sample. In the case of the moist-heat resistant durability of the prepared sample, it was evaluated according to the following criteria by observing occurrence of bubbles and peeling at the pressure-sensitive adhesive interface after leaving the sample to stand at 65° C. and 95% relative humidity for 500 hours. In the case of the heat resistant durability, it was evaluated according to the following criteria by also observing occurrence of bubbles and peeling after maintaining the sample at 100° C. for 500 hours.

<Heat Resistant and Moist-Heat Resistant Durability Evaluation Criteria>

A: no bubbles and peeling occurred
B: slight bubbles and/or peeling occurred
C: large amount of bubbles and/or peeling occurred 3. Glass Transition Temperature The glass transition temperature (Tg) of a block copolymer or each block of the block copolymer was calculated according to Equation A below.

$$1/Tg = \Sigma Wn/Tn \quad [\text{Equation A}]$$

In Equation above, Wn is a weight fraction of the monomer applied to a block copolymer or each block of the block copolymer, and Tn represents a glass transition temperature when each of the corresponding monomers has formed a homopolymer. That is, in Equation A, the right side is a result of summing up the calculated values after calculating all the values (Wn/Tn) obtained by dividing the weight fraction of the used monomer by the glass transition temperature appearing when the monomer has formed the homopolymer for each monomer.

4. Refractive Index (R.I.) and Optical Characteristic of Each Block (1) Refractive Index The refractive index of each block included in the copolymers of Examples and Comparative Examples was calculated according to the above-described relational expressions and equations.

(2) Optical Characteristic

The pressure-sensitive adhesive polarizing plates prepared in Examples or Comparative Examples were each cut so as to have a width of 40 mm and a length of 40 mm to prepare a specimen. Subsequently, it is attached to a jig having a width of 40 mm and a length of 40 mm. Then, using UV-VIS Spectrophotometer (JASCO, model name V-7100) equipment, the single transmittance (%, Ts), parallel transmittance (%, Tp), crossed nicol transmittance (%, Tc, orthogonal transmittance) and polarization degree (%, P.E.) for the TD and MD directions of the polarizing plate were each measured after the pressure-sensitive adhesive side was placed toward the light source.

5. Light leakage

In order to investigate uniformity of light transmittance, it was observed using a backlight whether there was a light leakage portion in the dark room.

Panel type: LCD module for TN

Specimen: 2 polarizing plates to which the pressure-sensitive adhesive fitting LCD module size is attached
Polarizing plate check: polarizing plate tailored in the 45 degree direction with respect to the stretching direction Wide view liquid crystal direction check of polarizing plate: The long side of the polarizing plate is held with both hands and shone vertically on the LCD monitor so that light is not transmitted, and then the long side of the polarizing plate is bent toward the body to check which light of the left and right leaks, where if the light leaking direction is to the right, the down right direction is the liquid crystal direction.

(1) The LCD module is disassembled, the polarizing plate attached to the LCD cell is removed and the cell surface is wiped with EAc.

(2) After checking the wide view liquid crystal coating direction of the polarizing plate, the polarizing plate is attached so that the liquid crystal direction faces away from the side tap, as shown in the FIGURE. Two upper and lower specimens are attached to both sides of the cell in the state that the polarized light is crossed, and the direction is aligned so that the top and bottom of the liquid crystal direction cross.

(3) The cell is stored for 240 hours under aging conditions (moist-heat resistant condition: a temperature of 65° C. and 95% relative humidity, heat resistant condition: a temperature of 100° C.), and then left to stand at room temperature for 2 hours to observe the light leakage.

Method of observing light leakage: it was evaluated according to the following criteria by observing the LCD module with the naked eye while driving it.

<Evaluation Criteria>

A: it is difficult to determine the light leakage with the naked eye.
B: slight light leakage
C: some light leakage
D: large amount of light leakage 6. Peel Force The release pressure-sensitive adhesive laminates prepared in Examples or Comparative Examples were each tailored so as to have a width of 25 mm and a height of 100 mm to prepare specimens. Subsequently, the release PET film attached to the pressure-sensitive adhesive layer is peeled off and the pressure-sensitive polarizing plate is attached to glass (soda lime glass) using a roller of 2 kg in accordance with the provision of JIS Z 0237. The glass with the attached polarizing plate is squeezed in an autoclave (50° C., 5 atm) for about 20 minutes and stored under constant temperature and humidity conditions (23° C., 50% relative humidity) for 24 hours to prepare a sample. Thereafter, the peel force is measured while peeling the polarizing plate from the glass at a peel rate of 0.3 m/min and a peel angle of 180°, using TA equipment (Texture Analyzer, manufactured by Stable Micro Systems, UK).

7. Interface Adhesive Force

The pressure-sensitive adhesive polarizing plates prepared in Examples and Comparative Examples were tailored so as to have a width of 25 mm and a height of 100 mm to prepare specimens. Thereafter, the specimen is attached to a PET (poly(ethylene terephthalate)) film via the pressure-sensitive adhesive layer to prepare a laminate, and after maintaining the laminate at room temperature for 3 days, the laminate is attached to a glass substrate with a double-sided tape so that the PET film comes to the top, and then the interface adhesive force is evaluated by measuring the adhesive force between the polarizing plate and the PET film while peeling the PET film at room temperature at a peel rate of 10 mm/sec and a peel angle of 180°.

<Preparation Examples of Copolymers>

Preparation Example 1

Preparation of Block Copolymer (A1)

0.098 g of EBiB (ethyl 2-bromoisobutyrate), 160 g of methyl methacrylate (MMA), 30 g of butyl methacrylate (BMA) and 10 g of hydroxyethyl methacrylate (HEMA) were mixed in 370 g of ethyl acetate (EAc). The reactor containing the mixture was sealed, purged with nitrogen and stirred at about 25° C. for about 30 minutes, and dissolved oxygen was removed through bubbling. Thereafter, 0.0338 g of $CuBr_2$, 0.0876 g of TPMA (tris(2-pyridylmethyl)amine) and 0.226 g of V-65 (2,2'-azobis(2,4-dimethyl valeronitrile)) were introduced to the mixture in which oxygen was removed and the mixture was immersed in a reaction tank at about 67° C. to initiate the reaction (polymerization of the first block). When the conversion of methyl methacrylate was about 70%, a mixture of 829 g of n-butyl acrylate (BA), 15 g of hydroxybutyl acrylate (HBA), 100 g of benzyl acrylate (BzA), 60 g of hydroxyethyl acrylate (HEA) and 411 g of ethyl acetate (EAc), which had been previously bubbled with nitrogen, was introduced thereto in the presence of nitrogen. Then, 0.0264 g of $CuBr_2$, 0.0685 g of TPMA and 0.335 g of V-65 were added to the reactor, and a chain extension reaction was carried out (polymerization of the second block). If the conversion of the monomer (BA) reached 80% or more, the reaction mixture was exposed to oxygen and diluted with an appropriate solvent to terminate the reaction, thereby preparing the block copolymer (in the above process, V-65 was appropriately divided and introduced until the end of the reaction in consideration of its half-life).

Preparation Examples 2 to 6

Preparation of Block Copolymers (A2 to A3 and B1 to B3)

Block copolymers were prepared in the same manner as in Preparation Example 1, except that the raw materials used in the polymerization of the first block and the second block were controlled as in Table 1 below.

TABLE 1

| | | Preparation Example of diblock copolymer | | | | | |
|---|---|---|---|---|---|---|---|
| | | 1 A1 | 2 A2 | 3 A3 | 4 B1 | 5 B2 | 6 B3 |
| First block | MMA ratio | 80 | 77 | 77 | 80 | 70 | 95 |
| | BMA ratio | 15 | 20 | 20 | 15 | 30 | — |
| | HEMA ratio | 5 | 3 | 3 | 5 | — | 5 |
| | Tg(° C.) | 92 | 83 | 83 | 92 | 80 | 107 |
| | Mn(×10,000) | 8.7 | 6.1 | 5.8 | 8.7 | 5.5 | 8.5 |
| | PDI | 2.01 | 2.05 | 2.05 | 2.01 | 2.1 | 2.1 |
| | $R.I_1$ | 1.482 | 1.478 | 1.478 | 1.482 | 1.470 | 1.492 |
| Second block | BzA ratio | 10 | 20 | 10 | 10 | 10 | 10 |
| | BA ratio | 82.5 | 75.5 | 82.5 | 88.5 | 88.5 | 88.5 |
| | HBA ratio | 1.5 | 1.5 | 1.5 | 1.5 | 1.5 | 1.5 |
| | HEA ratio | 6 | 3 | 6 | — | — | — |
| | Tg(° C.) | −35.1 | −44.8 | −35.1 | −50 | −50 | −50 |
| | $R.I_2$ | 1.473 | 1.476 | 1.472 | 1.470 | 1.470 | 1.470 |
| Block copolymer | Mn(×10,000) | 23.3 | 21.5 | 21.7 | 23.0 | 29.2 | 22.3 |
| | PDI | 3.0 | 3.3 | 3.1 | 3.0 | 3.2 | 3.2 |
| | First block:Second block (weight ratio) | 20:80 | 15:85 | 15:85 | 20:80 | 11:89 | 20:80 |
| | ΔR.I. | 0.009 | 0.002 | 0.006 | 0.012 | 0 | 0.022 |

Monomer ratio unit: part by weight
MMA: methyl methacrylate (homopolymer Tg: about 110° C./homopolymer R.I.: 1.491)
BMA: butyl methacrylate (homopolymer Tg: about 26° C./homopolymer R.I. 1.422)
HEMA: hydroxyethyl methacrylate (homopolymer Tg: about 57° C./homopolymer R.I. 1.512)
BzA: benzyl acrylate (homopolymer Tg: about 6° C./homopolymer R.I. 1.514)
BA: n-butyl acrylate (homopolymer Tg: about −54° C./homopolymer R.I. 1.465)
HBA: 4-hydroxybutyl acylate (homopolymer Tg: about −80° C./homopolymer R.I. 1.452)
HEA: 2-hydroxylethyl acrylate (homopolymer Tg: about −15° C./homopolymer R.I. 1.507)
Mn: number average molecular weight
PDI: molecular weight distribution
Tg: glass transition temperature
R.I.: refractive index

EXAMPLES AND COMPARATIVE EXAMPLES

Example 1

0.15 parts by weight of a TDI-based cross-linking agent (Coronate L, manufactured by Japan NPU), 0.01 parts by weight of DBTDL (dibutyltin dilaurate) and 0.5 parts by weight of an epoxy group-containing silane coupling agent (KBM-403, 3-glycidoxypropyl trimethoxysilane), relative to 100 parts by weight of the block copolymer (A1) prepared in Preparation Example 1, were mixed and ethyl acetate as a solvent was blended and controlled so as to have a coating solid content of about 25 wt % to prepare a coating liquid (pressure-sensitive adhesive composition).

The prepared coating solution was coated on the release-treated surface of a release PET (poly(ethylene terephthalate)) (MRF-38, manufactured by Mitsubishi) having a thickness of 38 μm so as to have a thickness after drying of about 23 μm, and maintained in an oven at 80° C. for about 3 minutes (production of a release pressure-sensitive adhesive laminate).

After drying, the coating layer formed on the release PET was laminated on one side of a polarizing plate (laminated structure of COP/PVA/COP: COP=cyclopolyolefin, PVA=polyvinyl alcohol-based polarizing film) to produce a pressure-sensitive polarizing plate. At this time, the crossed nicol transmittance (Tc) of the used polarizing plate is about 0.001%, the polarization degree (P.E.) is a level of 99.997 to 99.998%.

Examples 2 to 3 and Comparative Examples 1 to 9

A pressure-sensitive adhesive composition (coating liquid) and a pressure-sensitive adhesive polarizing plate were prepared in the same manner as in Example 1, except that upon preparing the pressure-sensitive adhesive composition (coating liquid), components and ratios were each adjusted as in Table 2 below.

TABLE 2

| | | Polymer | | Cross-linking | | Epoxysilane | Non-epoxysilane |
| | | Type | Content | agent content | DBTDL | compound | compound* |
|---|---|---|---|---|---|---|---|
| Example | 1 | A1 | 100 | 0.15 | 0.01 | 0.5 | — |
| | 2 | A2 | 100 | 0.15 | 0.01 | 0.5 | — |
| | 3 | A3 | 100 | 0.15 | 0.01 | 0.5 | — |
| Comparative | 1 | B1 | 100 | 0.15 | 0.01 | 0.5 | — |
| Example | 2 | B2 | 100 | 0.15 | 0.01 | 0.5 | — |
| | 3 | B3 | 100 | 0.15 | 0.01 | 0.5 | — |
| | 4 | B1 | 100 | 0.15 | 0.01 | — | 0.5 |
| | 5 | B2 | 100 | 0.15 | 0.01 | — | 0.5 |
| | 6 | B3 | 100 | 0.15 | 0.01 | — | 0.5 |

Content unit: part by weight
Non-epoxysilane compound*: a silane coupling agent with a beta-cyanoacetyl group (M812, LG Chemical)

Physical property measurement results are as shown in Table 3.

TABLE 3

| | | $|\Delta R.I.|$ | Tc (%) | P.E. (%) | Heat resistant durability at 100° C. | Moist-heat resistant durability at 65° C., 95% | Light leakage (heat resistant condition at 100° C.) | Light leakage (moist-heat resistant condition at 65° C., 95%) | Peel force (gf/25 mm) | Interface adhesive force (gf/25 mm) |
|---|---|---|---|---|---|---|---|---|---|---|
| Example | 1 | 0.009 | 0.001 | 99.997 | A | A | A | A | 380 | 3,450 |
| | 2 | 0.002 | 0.001 | 99.998 | A | A | A | A | 450 | 3,320 |
| | 3 | 0.006 | 0.001 | 99.998 | A | A | A | A | 420 | 3,210 |
| Comparative | 1 | 0.012 | 0.002 | 99.993 | B | B | C | C | 340 | 2,600 |
| Example | 2 | 0.0 | 0.001 | 99.998 | C | C | C | C | 2,800* | 780 |
| | 3 | 0.022 | 0.002 | 99.993 | B | B | C | C | 220 | 3,130 |
| | 4 | 0.012 | 0.002 | 99.993 | B | C | C | C | 360 | 800 |
| | 5 | 0.0 | 0.001 | 99.998 | C | C | C | C | 3,100* | 760 |
| | 6 | 0.022 | 0.002 | 99.993 | B | C | C | C | 210 | 2,190 |

*pressure-sensitive adhesive residue occurs on glass

As confirmed in Tables 1 to 3 above, in the case of the pressure-sensitive adhesive polarizing plates having the block copolymers of Examples, the optical characteristics are maintained, and at the same time, the durability, peel force and interface adhesive force are excellent. On the other hand, in the case of Comparative Examples 1, 3, 4 and 6 using block copolymers that do not satisfy the above relational expression ($|\Delta R.I.|<0.011$), the optical characteristics of the pressure-sensitive adhesive polarizing plates are not good. In the case of Comparative Examples 2 and 5, they have not secured the sufficient degree of cross-linking as in Examples, and the durability is not good because the content of hard blocks is small.

The invention claimed is:
1. A pressure-sensitive adhesive composition comprising:
a block copolymer including
a first block having a glass transition temperature of 50° C. or more and having a cross-linkable functional group;
a second block having a glass transition temperature of −10° C. or less; and
an epoxysilane compound,
wherein a refractive index ($R.I._1$) of the first block and a refractive index ($R.I._2$) of the second block are calculated through Equation and satisfy Relational Expression:

$$R.I.=\Sigma\{Rn\times(Wn/100)\} \quad \text{[Equation]}$$

wherein, R.I. is a refractive index of the first block or the second block, Wn/100 is a weight fraction of each of a monomer component used to form the first block or the second block, and Rn is a refractive index of a homopolymer of the monomer;

$$|\Delta R.I.|=|R.I._1-R.I._2|<0.011 \quad \text{[Relational Expression]}$$

wherein, ΔR.I. is an absolute value of a difference between the refractive index ($R.I._1$) of the first block and the refractive index ($R.I._2$) of the second block, and
wherein the second block comprises two or more polymerized units derived from two or more different compounds of Formula 1, respectively, capable of providing cross-linkable functional groups:

[Formula 1]

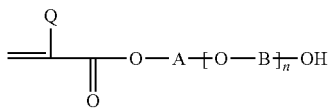

wherein, Q is hydrogen or an alkyl group, A and B are each independently an alkylene group, and n is an integer in a range of 0 to 10, wherein the two or more polymerized units comprise a polymerized unit derived from a monomer (M1) and a polymerized unit derived from a monomer (M2), wherein a carbon number of A, a carbon number of B, or a carbon number combining the carbon numbers of A and B in the monomer (M1) is larger than a carbon number of A, a carbon number of B or a carbon number combining the carbon numbers of A and B in the monomer (M2), and the monomer (M1) is included in a lesser amount than the monomer (M2), and wherein the second block comprises the polymerized unit derived from 0.5 to 5 parts by weight of the monomer (M1) and the polymerized unit derived from 1 to 10 parts by weight of the monomer (M2), and a weight ratio of the monomer (M2) and the monomer (M1) is at least 2:1.

2. The pressure-sensitive adhesive composition according to claim 1, wherein the first block or the second block comprises an aromatic group.

3. The pressure-sensitive adhesive composition according to claim 2, wherein the first block comprises a polymerized unit derived from a compound of Formula 1 capable of providing a cross-linkable functional group:

[Formula 1]

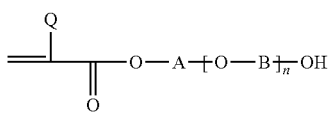

wherein, Q is hydrogen or an alkyl group, A and B are each independently an alkylene group or an alkylidene group, and n is an integer in a range of 0 to 10.

4. The pressure-sensitive adhesive composition according to claim 1, wherein the second block comprises a unit derived from a compound capable of providing an aromatic group, and the compound capable of providing the aromatic group comprises an aromatic group and a vinyl group.

5. The pressure-sensitive adhesive composition according to claim 4, wherein the compound capable of providing an aromatic group is represented by Formula 2:

[Formula 2]

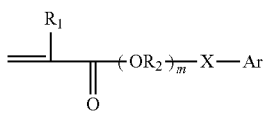

wherein, $R_1$ is hydrogen or an alkyl group, $R_2$ is an alkylene group or an alkylidene group, m is an integer of 0 to 5, X is a single bond, an oxygen atom or a sulfur atom, and Ar is an aryl group.

6. The pressure-sensitive adhesive composition according to claim 5, wherein the second block comprises a cross-linkable functional group and an aromatic group.

7. The pressure-sensitive adhesive composition according to claim 6, wherein the second block comprises a polymerized unit derived from 20 to 98 parts by weight of (meth) acrylic acid ester, a polymerized unit derived from 1 to 40 parts by weight of a compound capable of providing a cross-linkable functional group, and a polymerized unit derived from 1 to 40 parts by weight of a compound capable of providing an aromatic group.

8. The pressure-sensitive adhesive composition according to claim 6, wherein the first block comprises a polymerized unit derived from 80 to 99 parts by weight of (meth) acrylic acid ester and a polymerized unit derived from 1 to 20 parts by weight of a compound capable of providing a cross-linkable functional group.

9. The pressure-sensitive adhesive composition according to claim 1, wherein the first block has a number average molecular weight (Mn) in a range of 10,000 to 250,000, and the first block has a molecular weight distribution in a range of 1.0 to 3.0.

10. The pressure-sensitive adhesive composition according to claim 1, wherein the block copolymer has a number average molecular weight (Mn) in a range of 100,000 to 500,000, and a molecular weight distribution in a range of 2.0 to 5.0.

11. The pressure-sensitive adhesive composition according to claim 1, wherein the block copolymer is a diblock copolymer.

12. The pressure-sensitive adhesive composition according to claim 1, wherein the block copolymer is a diblock copolymer comprising 5 parts by weight to 50 parts by weight of the first block and 50 parts by weight to 95 parts by weight of the second block.

13. The pressure-sensitive adhesive composition according to claim 12, further comprising 0.01 to 20 parts by weight of a cross-linking agent relative to 100 parts by weight of the block copolymer.

14. A pressure-sensitive adhesive optical laminate comprising:
an optical film; and
a pressure-sensitive adhesive layer formed on at least one side of the optical film, wherein the pressure-sensitive adhesive layer is formed from the pressure-sensitive adhesive composition according to claim 1.

15. The pressure-sensitive adhesive optical laminate according to claim 14, wherein the pressure-sensitive adhesive optical laminate is a pressure-sensitive adhesive polarizing plate comprising: one or more films selected from a protective film or an optical functional film; and a polarizer.

16. The pressure-sensitive adhesive optical laminate according to claim 15, wherein the pressure-sensitive adhesive polarizing plate has crossed nicol transmittance (Tc) of less than 0.002% and satisfies a polarization degree (P.E) in a range of 99.996 to 99.998%.

* * * * *